United States Patent [19]

Sautereau et al.

[11] Patent Number: 4,540,844
[45] Date of Patent: Sep. 10, 1985

[54] ELECTRICAL IONIZING DEVICES FOR LIGHTNING PROTECTION

[75] Inventors: Michel Sautereau, Boulogne; Roger Nicod, Amboise; Pierre Langlois, Paris, all of France

[73] Assignee: Societe Francaise Helita, Paris, France

[21] Appl. No.: 594,356

[22] Filed: Mar. 28, 1984

[51] Int. Cl.³ .............................................. H02G 13/00
[52] U.S. Cl. ........................................ 174/3; 174/4 R
[58] Field of Search .............. 174/2, 3, 4 R; 361/117, 361/137, 222, 230, 231, 235

[56] References Cited

U.S. PATENT DOCUMENTS 4,480,146 10/1984 Invernizzi .............................. 174/3

FOREIGN PATENT DOCUMENTS 0060756 9/1982 European Pat. Off. ................ 174/3
1089440 9/1960 Fed. Rep. of Germany ..... 174/4 R Primary Examiner—Laramie E. Askin
Attorney, Agent, or Firm—Ladas & Parry

[57] ABSTRACT

In this device a point (100) is brought to a high tension potential by a generator (300). The grounding in case of lightning is effected by a rod (210) brought to the potential of the earth. A spark-gap device is constituted by the base (120) of the point and a crown (240) connected to the rod (210). According to the invention, to protect the dielectric interval of this spark gap, the base of the point is extended downwardly by a flared skirt (130) that covers the crown (240), at least partially, the visible portion (231) of the insulating sheath (230) is hollowed so as to remove its surface (232) from the armatures of the spark gap and there is given to the interior of the skirt (130) a surface condition that makes it possible to avoid any punctual deformation of the electric field.

4 Claims, 1 Drawing Figure

U.S. Patent  Sep. 10, 1985  4,540,844
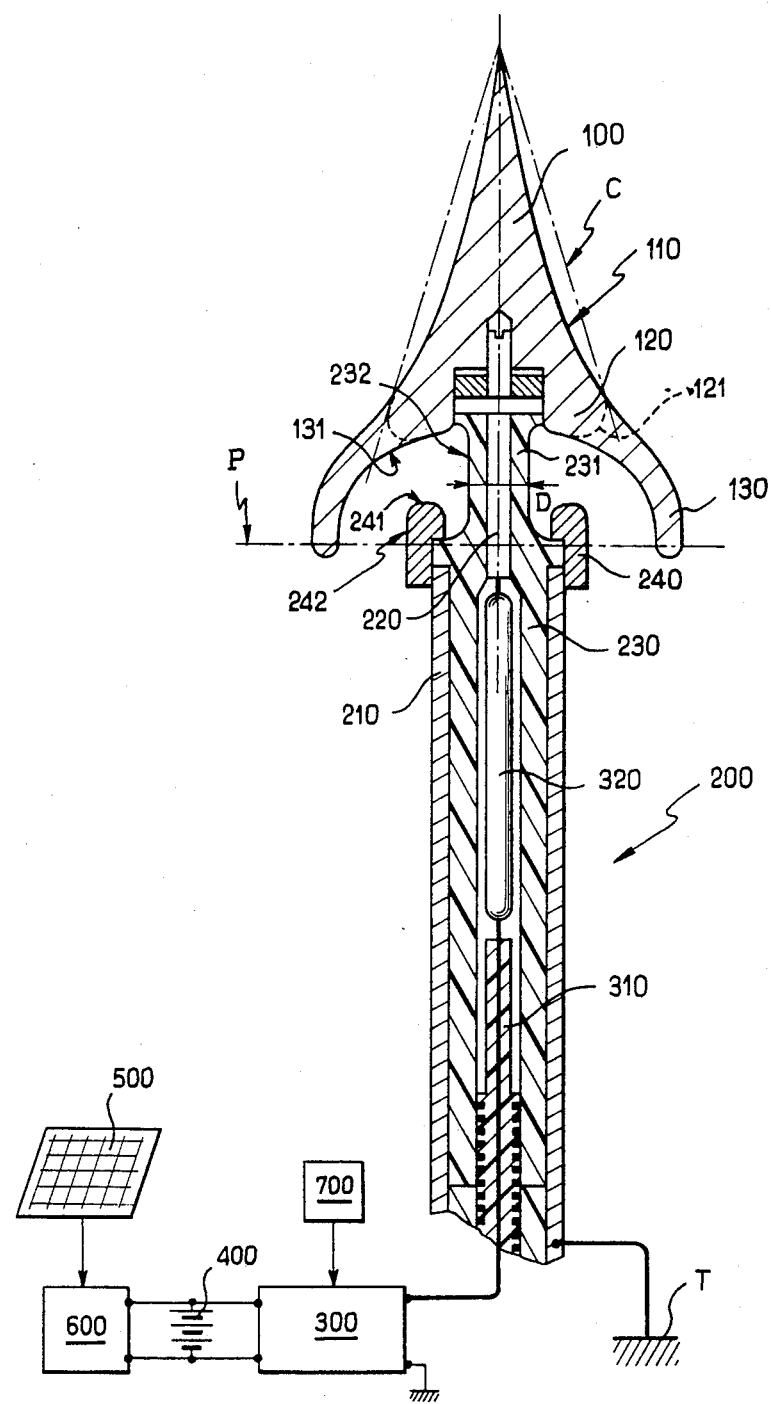

ELECTRICAL IONIZING DEVICES FOR LIGHTNING PROTECTION

This invention concerns itself with an improvement in electrical ionizing devices for protection against lightning.

In these devices there is formed above the point of a lightning rod a column of ionized air so as to facilitate the occurrence of lightning by increasing the conductivity of the atmospheric air and therefore diminishing the tension threshold beyond which will be produced the electrical discharge that constitutes the thunderbolt.

In order to carry out said ionization, the point is brought to a very high tension (typically several tens of kV) so as to produce and maintain at its maximum a Corona discharge. The ions generated by said Corona discharge then diffuse in the surrounding medium the point of the lightning rod and are accelerated by the surrounding electric field, thus forming the ionized air column, the effects of which have been described above.

Such an ionizing electrical device has been particularly described in EP No.-0.060.756.

More precisely, said document describes a combination including:

a lightning rod point, the lateral surface of which is a rotation surface inscribed within an enveloping cone, a conductive rod connected to the earth potential and supporting the point, said rod being hollow and housing a central core, which core is electrically connected to the point and protected by an insulating sheath of the rod, a high-tension source for bringing the point to an elevated potential capable of generating an emission of ions by Corona effect, and a spark-gap device that makes it possible electrically to connect the point to the earth in case the latter is subjected to a thunderbolt or other excessive tension, said spark-gap device including an upper armature formed by the base of the point and a lower armature including a conductive crown connected to the rod and situated opposite the base of the point and spaced therefrom.

Such a device has been entirely satisfactory from the point of view of its performances and effectiveness that have proved to be very superior to those of the radioactive ionizing lightning rods of the prior art.

However, it has been found desirable to protect against external atmospheric agents the lower portion of the device, that is, the one that constitutes the spark gap.

In effect, in the classical lightning rods (simple Franklin point or radioactive ionizing lightning rods) the whole device is grounded the same as the point of the rod that supports it. On the other hand, in an electrical ionizing lightning rod, the point is no longer grounded but is put under tension; because of this, a very large gradient potential exists between the point and the rod that remains grounded. This region, which substantially corresponds to that of the dielectric interval of the spark gap, is therefore very sensitive to any local disturbance capable of modifying the distribution of the potential in said interval.

Particularly the prolonged use of lightning rods of said type has shown that air could, under certain conditions, cause more or less conductive dust particles to deposit in the proximity of this dielectric interval.

Those dust particles tend to deposit specially on the portion exposed to this spot of the insulating sheath that surrounds the high-tension conductor that feeds the point. This can result in a lowering of the starting tension of the spark gap, which causes untimely discharges, even though of weak intensity, in the spark gap.

Besides, leaking in this zone should be avoided, since the water could produce a short circuit between the point and the rod, which would cause a quick discharge of the storage battery, the high-tension generator delivering then an intensity superior to the normal value corresponding to a simple emission of ions.

Moreover, it has been observed that irregularities of the surface in the lower portion of the point involve the risk of producing excitations between the base of the point and the crown connected with the rod, creating the danger of the insulator cracking.

To overcome all these problems and increase the immunity of the device when it encounters atmospheric agents, the invention proposes to improve the above mentioned device by the combination of the following characteristics:

the base of the point is lengthened by a flared protective skirt that extends downwardly so as to cover, at least partially, the conductive crown, the distance separating the internal surface of the skirt from the lateral surface of the conductive crown remaining always at least equal to the distance between the armatures of the spark gap, the insulating sheath is upwardly extended until reaching the base of the point and it has, on all the portion situated at the height of the dielectric interval between the armatures of the spark gap, a narrowing of its diameter so as to increase the distance between the surfaces in respect to the sheath and the armatures of the spark gap, the roughness $R_a$ of the internal surface of the skirt is less than 0.2 μm.

In order to ensure effective protection against rain and leakage, the skirt preferably extends downwardly at least to the level of the central plane of the conductive crown.

Likewise preferably, the upper surface of the conductive crown forming the lower armature of the spark gap is a rounded surface with its convexity turned upwards.

In addition, when the high-tension source is fed by a plug accumulator charged by a combination of solar cells, it is advantageous to provide threshold means apt to interrupt the feeding of the high-tension source by the accumulator when the tension of the latter descends on this side of a predetermined value so that it can be satisfactorily recharged from the energy furnished by the combination of solar cells.

Other characteristics and advantages of the invention will become apparent from the reading of the following detailed description of an embodiment, which description is given with reference to the only FIGURE accompanied, which illustrates a section, in elevation, of the device for lightning protection according to the invention.

On this FIGURE is shown a point 100 made according to the teachings of EP-0.060.756; the tapered shape of the point is obtained by a rotation surface 110 entirely inscribed in a cone C and generated by a meridian with its convexity turned toward the rotation axis. The base 120 of the point forms the first armature of a spark-gap device and it is extended by a flared protective skirt 130 that will be described below (the dotted line 121 indicates the shape of the base of the point for a lightning rod of the prior art, without the protective skirt 130).

This point 100 is mounted on a coaxial support 200 that comprises a hollow conductive rod 210 connected to the earth T and forming the external armature of the coaxial support 200. The point 100 is secured, for example by screwing, to a central conductive core 220 in the form of a metal stem. This central core is brought to an elevated potential (typically from 20 to 30 kV) produced by a high-tension generator 300 that feeds the point by a central coaxial cable 310 and by means of a protective resistance 320.

The combination of all the elements under pressure is insulated from the external rod 210 by an insulator 230 that in addition is extended into the upper portion 231 so that the stem 220 remains entirely protected even above the level of the rod 210.

In the upper portion of the rod 210 has been provided a conductive crown 240 electrically and mechanically connected to the rod and situated opposite the base 120 of the point and spaced therefrom so as to form a second armature (grounded) of a spark-gap device.

According to this invention the dielectric interval comprised between the base 120 of the point and the crown 240 is protected by means of the flared skirt 130 that lengthens the point downwardly and covers, at least partially, the conductive crown 240. The skirt preferably extends downwardly at least to the level of the central plane P of the conductive crown so as to protect entirely the active portion of the spark gap. Of course the distance that separates the internal surface 131 of the skirt from the lateral surface (upper surface 241 and peripheral surface 242) of the crown 240 remains always at least equal to the distance between the armatures of the spark gap (determined according to the desired disruptive potential).

In addition, the emerging portion 231 of the insulating sheath 230 has a narrowing 232 of reduced D diameter so as to remove the surface of this emerging portion from the armatures of the spark gap (base of the point and top of the crown); thus, the more or less conductive dust particles that would deposit in this spot are prevented from disturbing the potential gradient between the armatures, which could result in a lowering of the disruptive potential of the spark gap.

Finally, within the same order of ideas, the internal surface 131 of the skirt receives a good surface condition by thorough polishing. By "good surface condition" it is understood that the roughness $R_a$ in this place remains in all points below a maximum value of 0.2 μm (8 μin). The measuring criterion (roughness $R_a$) corresponding to this value is the arithmetical medium height, that is, the absolute medium of the variations of the profile in relation to the medium line.

The upper surface 241 of the conductive crown (that is, the surface forming the lower armature of the spark gap) is preferably given a rounded shape with the convexity upwardly turned, said portion of the crown receiving a surface condition comparable to that of the lower surface 131 of the skirt facing it.

In addition, in order to give the device its autonomy in electric energy, the high-tension generator 300 is fed by a combination of storage batteries 400 connected to a charger 600 fed from a panel of solar cells 500. To avoid a continuous operation, a storm detector 700 (for example, a detector of radioelectric disturbances) sets the generator 300 in operation only when the probability of a thunderbolt exceeds a certain threshold.

However, in case of intensive operation, it is desirable to avoid the total discharge of the battery. To this effect, the pressure of the battery is adjusted in relation to a threshold value (for example, a threshold of 4.7 V of a battery tension of 6 V); when the tension of the battery descends below said threshold, the generator 300 is systematically disconnected until the battery is recharged by the solar panel.

We claim:

1. A device for protection against lightning including:
    a lightning rod point (100), the lateral surface (110) of which is a rotation surface inscribed in an enveloping cone (C),
    a conductive rod (210) connected to the potential of the earth and supporting said point, said rod being hollow and housing a central core (220), which core is electrically connected to the point and protected by an insulating sheath (230) of said rod,
    a high-tension source (300) for bringing said point to an elevated potential capable of generating an emission of ions by Corona effect, and a spark-gap device that makes it possible electrically to connect said point to the earth in case the latter is subjected to a thunderbolt or other excessive tension, said spark-gap device including an upper armature formed by the base (120) of said point (100) and a lower armature including a conductive crown (240) connected to said rod (210) and situated opposite the base of said point and spaced therefrom, characterized in that said base of said point is
        lengthened by a flared protective skirt (130) extending downwardly so as to cover at least partially said conductive crown (240), the distance separating the internal surface (131) of said skirt from the lateral surface (241, 242) of said conductive crown remaining always at least equal to the distance between said armatures of said spark gap,
    said insulating sheath (230) is upwardly extended until reaching the base of said point and has, specially on the portion (231) situated at the height of the dielectric interval between said armatures of said spark gap, a narrowing (D) of its diameter so as to increase the distance between the surfaces (232; 131, 241) facing said sheath and said armatures of said spark gap,
    the roughness $R_a$ of said internal surface (131) of said skirt is less than 0.2 μm.

2. A device according to claim 1, characterized in that said skirt extends downwardly at least to the level of the central plane (P) of said conductive crown.

3. A device according to claim 1, characterized in that said upper surface (241) of said conductive crown forming said lower armature of said spark gap is a rounded surface having its convexity upwardly turned.

4. A device according to claim 1, wherein said high-tension source (300) is fed by a plug accumulator (400) charged by a combination of solar cells (500), characterized in that it is provided with threshold means apt to interrupt the feeding of said high-tension source by said accumulator when the tension of the latter descends on this side of a predetermined value so that it can satisfactorily recharge itself from the energy furnished by said combination of solar cells.

* * * * *